April 18, 1967 T. E. MYERS 3,314,628
DUCTED ROTOR AIRCRAFT
Filed Nov. 18, 1964 3 Sheets-Sheet 2
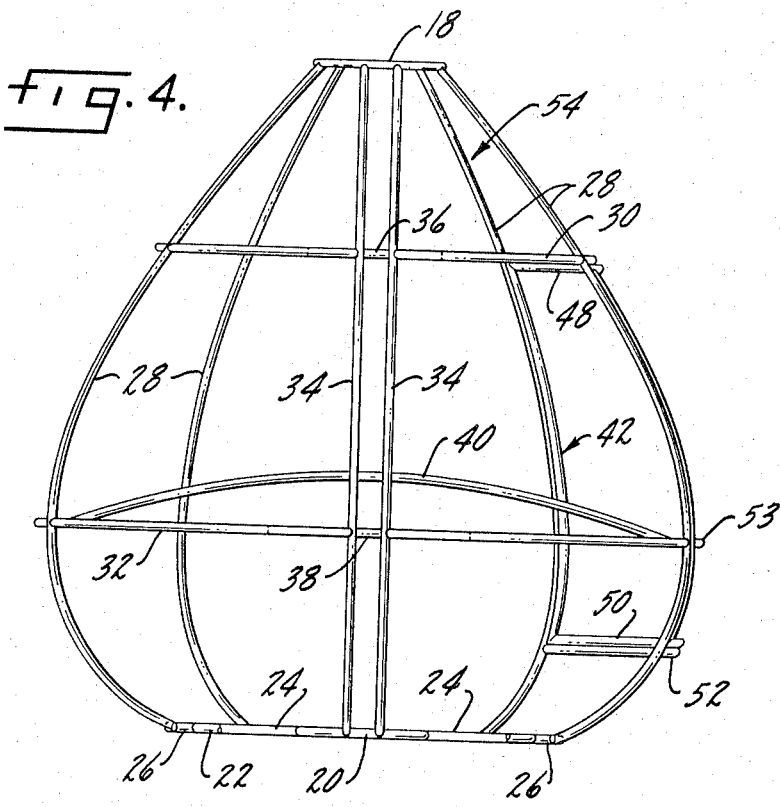
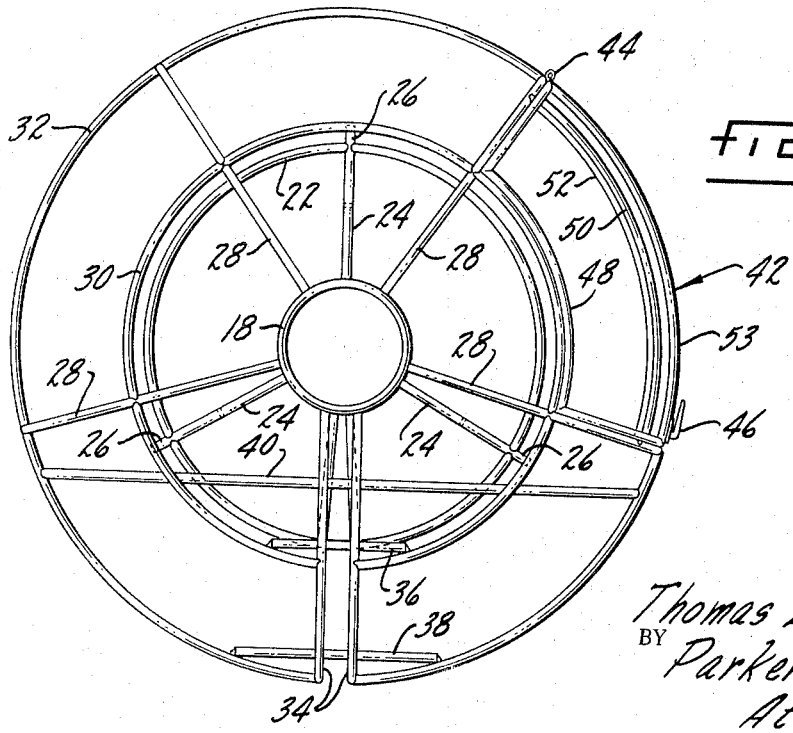
INVENTOR.
Thomas E. Myers,
BY Parker & Carter
Attorneys.

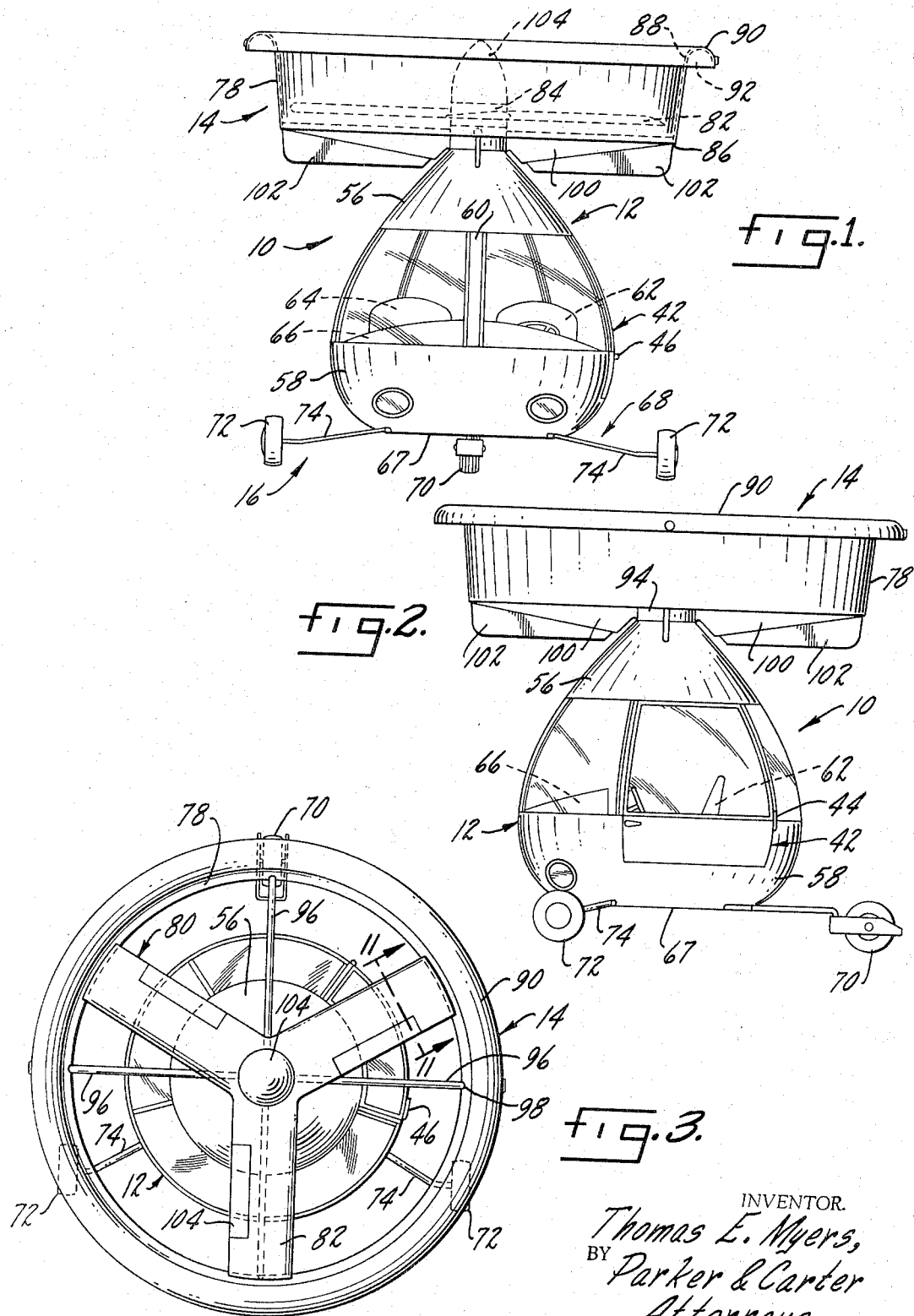

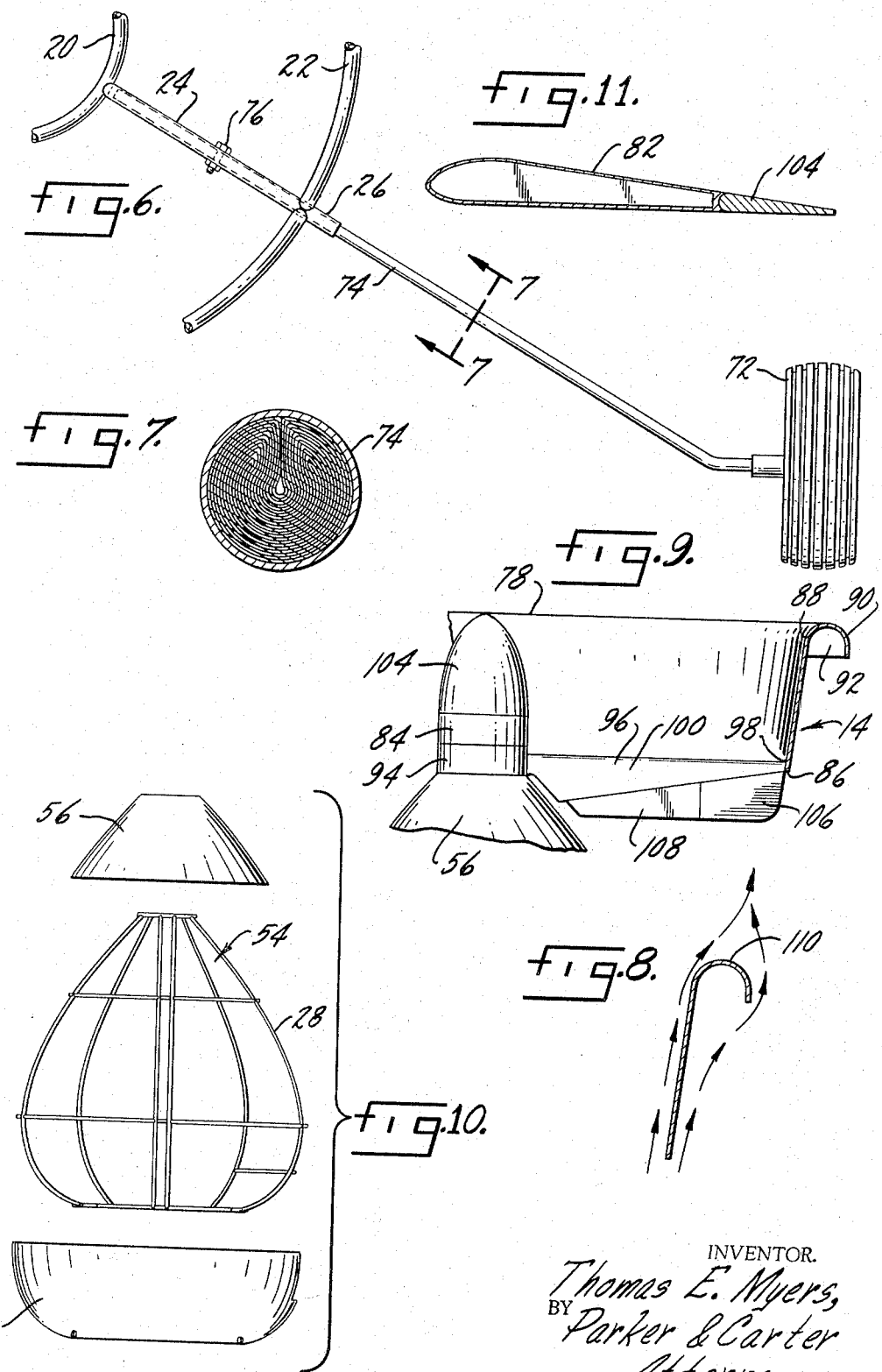

United States Patent Office 3,314,628
Patented Apr. 18, 1967

3,314,628
DUCTED ROTOR AIRCRAFT
Thomas E. Myers, Rte. 1, Box 560,
St. Charles, Ill. 60174
Filed Nov. 18, 1964, Ser. No. 412,203
11 Claims. (Cl. 244—17.17)

This invention is in the field of airplanes and is more specifically concerned with an airplane or aircraft of the type commonly known as vertical take off and landing.

A primary object of the invention is an aircraft which has greatly increased stability.

Another object is an aircraft of the above type which is free from buffeting and vibration.

Another object is an aircraft of the above type which does not use a hinge pin system in the rotor.

Another object is an aircraft of the above type in which the fuselage is rigidly connected to the rotor's duct system.

Another object is a fuselage structure for aircraft of the above type which provides much greater lift.

Another object is a fully shrouded rotor structure for an aircraft of the above type which will function as a large air brake area upon descent.

Another object is a rotor structure for a vertical take off and landing aircraft in which the rotary wings or spars are rigidly connected to the center hub or spinner.

Another object is an aircraft of the above type which does not have a maximum speed limit but still maintains stability and equilibrium.

Another object is a fuselage for an aircraft of the above type having a flat bottom which functions for braking during landing.

Another object is an aircraft of the above type with a fully ducted rotor system which prevents roll, pitch and yaw during landing.

Another object is a fully ducted rotor unit for an aircraft of the above type which offers a minimum of resistance when the aircraft is ascending.

Another object is a fuselage or air frame for an aircraft of the above type which gives greatly increased visibility.

Another object is a fuselage which has substantial strength and shock resistance characteristics.

Another object is a fuselage which adapts itself well to a cabin and is convenient for entry or egress.

Another object is a landing gear strut structure for an aircraft of the above type with greatly increased strength and flexibility.

Another object is a flexible tube section that may be used in the landing gear or otherwise of an aircraft of this type which has flexibility and full return characteristics upon substantial deflection.

Another object is a tube section of the above type which may be used in various types of structural work.

Another object is a fully ducted rotor unit of the above type in which the blades are in the form of wing sections rigidly connected to the spinner or rotor and each having a control tab or portion on the trailing edge thereof.

Another object is a wing section rotor of the above type having high lift characteristics.

Another object is a spar system for connecting the shrouded rotor arrangement to the fuselage in an aircraft of the above type which provides complete control, both forward and backward, as well as turning, and also trim control.

Other objects will appear from time to time in the ensuing specification and drawings in which:

FIGURE 1 is a front plan view of the aircraft;
FIGURE 2 is a side elevation of FIGURE 1;
FIGURE 3 is a top plan view of FIGURE 1;
FIGURE 4 is a front view of the air frame or fuselage, on an enlarged scale;
FIGURE 5 is a top view of FIGURE 4;
FIGURE 6 is an enlarged view of part of the landing gear;
FIGURE 7 is a section along line 7—7 of FIGURE 6, on an enlarged scale;
FIGURE 8 is a schematic of a portion of the duct structure, on an enlarged scale;
FIGURE 9 is an enlargement of the rotor strut system;
FIGURE 10 is an exploded view of the air frame or fuselage; and
FIGURE 11 is a section along line 11—11 of FIGURE 3, on an enlarged scale.

In FIGURES 1, 2 and 3, the aircraft is indicated generally at 10 and includes a fuselage or air frame indicated generally at 12, a fully ducted rotor indicated generally at 14, and a landing gear indicated generally at 16. It will be noted that the fuselage is somewhat teardrop shaped, large end down, and the tubing or frame work of the fuselage is shown in detail on an enlarged scale in FIGURES 4 and 5.

Considering the details of the fuselage itself, it is shown as made up of a top ring 18 and a bottom ring 20, which are shown as and may be approximately the same size. A somewhat larger ring 22 surrounds the bottom smaller ring 20 and is connected to it by a plurality of spokes or radials 24, three of which extend beyond ring 22, as at 26, to accept the landing gear, fully explained in detail hereinafter.

A plurality of so-called longerons 28 are connected between the top ring 18 and bottom ring 20 and are curved outwardly, more so at the bottom than at the top, as shown in FIGURE 4, to provide the teardrop appearance referred to hereinabove. These longerons may be equally spaced generally in a circumferential direction, except as indicated hereinafter, and are also connected by welding or the like to the large bottom ring. The longerons are interconnected by two intermediate rings, one toward the top, as at 30, which extends around and is welded or otherwise suitably connected to the longerons, and another, as at 32, which is somewhat greater in diameter, and as shown may be at the point of maximum bulge of the longerons, toward the bottom or base.

These two intermediate rings 30 and 32 need not necessarily be continuous. For example, I show them broken, in the lower part of FIGURE 5, where two quite closely spaced longerons 34 are provided. The intermediate rings 30 and 32 come together and are welded or otherwise suitably connected to these longerons but leave a space in between. To bridge these joints, I may provide a straddle or bracket 36 for the upper ring and 38 for the lower. I may position a somewhat arched-up brace 40 through the interior of the air frame, each end being connected by welding or otherwise to the lower intermediate ring 32.

Between two of the longerons, I may provide a door, indicated generally at 42, which in this case is positioned on the left rear quarter of the air frame. For example, the paired special longerons 34 may be considered to be the front of the fuselage. As such, the door is arcuate and fits between its two adjacent longerons and may be suitably hinged on the rear, as at 44, with a handle and lock 46 on the front edge. The top of the door 48 may rest next to the smaller intermediate ring 30, while the bottom 50 may have a special segment 52 connected between the two longerons. The somewhat larger intermediate ring 32 is broken through the door space to provide an arch 53 in the door.

The upper portion of the fuselage—the part from ring 30 and up—may be considered the engine compartment, and I may construct a ceiling or overhead inside of the fuselage generally coplanar with ring 30. This area, designated generally 54 in FIGURE 4, may be covered on the exterior by a somewhat conical cover or shield of fiberglass or the like, such as indicated at 56 in FIGURE 10. From ring 30 down may be considered the passenger compartment, access being provided through door 42. From the lower intermediate ring 32 down, I may cover the lower portion of the fuselage with a large bowl shaped exterior of fiberglass or the like, such as indicated at 58 in FIGURE 10, the upper edge of which may stop at ring 32. These parts are shown in exploded or expanded view in FIGURE 10 and it will be noted that the top cone 56 may be merely placed down on top of the metal frame and the entire frame may rest in the bottom bowl 58, all with suitable connections, with a suitable cut out being provided to accommodate the bottom portion of door 42. Suitable openings may be provided in the bottom bowl 58 to allow the landing gear stubs 26 to project through.

The intermediate portion of the air frame, between the top and bottom covers 56 and 58, will be open and I may provide a plurality of windows all the way around which will extend on top from ring 30 to the bottom at ring 32. Such an arrangement, for example, is indicated in FIGURES 1 and 2, these windows being plexiglass or glass or any suitable transparent window material. The closely spaced longerons 34 may be closed, as indicated at 60 in FIGURE 1, to provide a control channel or raceway between the operator controls in the cabin and the engine in compartment 54. But except for this narrow raceway or control channel 60, the windows may extend all the way around throughout the full 360° of the aircraft. Thus, the pilot, in seat 62, and any passengers in seat 64, will have full and practically unlimited visibility. Further, the instrument panel 66 may fit over and be supported on the intermediate cross brace 40.

The large and small bottom rings 20 and 22 may lie in the same plane so that the bottom of the fuselage or air frame, as indicated at 67 in FIGURES 1 and 2, may be considered to be generally flat, for reasons to be set forth hereinafter.

As shown in FIGURES 1 through 3, the landing gear may take the form of three wheel assemblies 68, approximately 120° apart, one directed generally rearwardly and the two forward ones approximately equidistant on each side of the front of the fuselage. The two forward wheels may be normal rotary wheels while the rear wheel 70 may be a caster wheel which may be controllable from within the cabin to steer the aircraft.

The details of one of the wheels and struts are shown in FIGURES 6 and 7, and while it is shown as one of the forward wheels, it should be understood that the same construction may be used for the caster or rear wheel except for the difference in the caster assembly. It will be noted that the wheel itself 72 is mounted at or near the end of a rod or tube 74 which may take the form of a tube projecting into the stub 26 in the frame. The tube 74 is much smaller than the stub 26 so that the stub will accept it easily and I may connect the two by a simple bolt, pin or cotter pin 76 positioned within the frame. Thus, if one of the wheels or struts becomes damaged or bent or otherwise needs replacement, the connection 76 may be easily removed from inside the aircraft and a new wheel and strut put in its place.

The strut itself is made up of a flexible tube with a plurality or bundle of fiberglass strips impregnated with a resin, such as an epoxy or the like, pulled or tightly compressed into the tube. For example, I may lay out a plurality of elongated strips of a suitable woven fabric such as fiberglass; dip them or otherwise impregnate them with a resin composition such as an epoxy resin; and then pull them through the tube. The cross section of the tube should be somewhat smaller than the bundle of strips. Or the other way around—the strips should be larger in cross sectional bulk than the tube so that the pulling action will compress and squeeze the strips into a tight, hard center core. The excess of the resin, of course, will be squeezed off and thereafter I allow the tube to dry long enough for the resin to set. This will give the resulting tube a spring action which will take a substantial landing force without a permanent set. Further, even when subjected to substantial deflection, the tubing will have full return and will snap back without taking a set.

It will be noted in the arrangement of the two forward wheels and the one caster wheel, the door 42, on the left rear quadrant, opens between two wheels. Thus, the passengers, either in entering the aircraft or departing, do not have to step over a wheel.

It should be noted in FIGURE 3 that the wheels are about the same distance radially outward from the center of the fuselage and are generally aligned with the outer edge of the rotor duct structure 14.

The rotor structure 14 includes an outer duct 78 around a center rotor 80, the rotor being made up of a plurality of blades or wings 82, shown in this case as three, all rigidly connected to a center spinner or hub 84. The duct itself, as at 78, is fully open in the center and truncated upwardly somewhat from its lower peripheral edge 86 to a top edge 88 where it is then turned out and over, all the way around, as at 90, say through a full 180°, to provide a peripheral overhang or gutter 92. The duct is connected to a center mounting 94, on top of the air frame, by a plurality of spars or beams 96, shown in this case as four. It will be noted in FIGURE 3 that these spars or beams extend radially from the center housing and are connected to the duct generally adjacent the lower edge thereof, as at 98. Since four such spars are used, they are generally equally spaced about 90° apart. One such spar extends forward, another aft, and one to each side. Each such spar is made up of an upper rigid portion 100 and a lower controllable tab or flap 102. While the duct has been shown as slightly diverging up or slightly tapered, it should be understood that it may be more or less cylindrical.

It will be noted in FIGURES 1 through 3 that the wings or blades 80 of the rotor itself are all joined rigidly to each other and to the center rotor 84 which is constructed to be rotated on a center spinner 104. The blades or wings, as such, are not adjustable and in cross section, as shown in FIGURE 11, have a wing shape and may have a fixed blade angle of attack, for example something on the order of 2°. It will be noted that the blades are, in fact, wings since they have an air foil cross section with a cord and camber of high lift. Each such wing has an adjustable lift control or tab 104 on a portion of the trailing edge thereof, which may be adjusted as a group to provide more or less lift.

Under certain circumstances, I may provide a small outer portion on each of the spars, as at 106 in FIGURE 9, which as a group may be adjusted or positioned independently of the lift control tabs 108.

The use, operation and function of my invention are as follows:

I provide a vertical take off and landing aircraft which does not have any adjustment and failure problems between the rotor blades and the rotor itself since the blades or wings are not adjustable. Rather, each blade of the rotor is made in wing section, such as shown in cross section in FIGURE 11, and has a trailing edge portion or lift control or tab which is adjustable. Additionally, I do not use any drag hinges or blade dampers. Thus, blade tracking problems, ground resonance and buffeting are all avoided or kept to a minimum because of the rigid wing construction. The essence of the solution is that the blades, or possibly more properly called wings, are fastened rigidly to the center hub or spinner and are not in and of themselves adjustable, and may be preset at a suitable angle of attack, for example 2°. The rigid connection between the blades or wings and the spinner itself prevents them from ever going out of track and I need no hinges. The effective angle of attack of the blade is acquired by the elevator type control surfaces on the trailing edge of the rotary wings. Thus, all problems concerned with a variable angle of attack and upward lift are bypassed.

The duct assembly itself is connected to the air frame or fuselage by four spars which extend rigidly between the duct and the air frame. In addition to serving as a mechanical rigid connection, they also serve as air straighteners or stabilizers. Each such spar has a trim tab or control surface along the lower portion thereof. The tab or flap on the rear of such spar may function as a rudder, the two side tabs may function to give forward or backward flight, and the forward such tab may trim or counteract torque. It should be noted that the air from the rotor first flows over the stationary portion 100 of the spars and then over the trim tabs. Thus, the stationary or fixed portions serve as air straighteners before the air gets to the control surfaces. This gives excellent control and the air straighteners will remove turbulence. The same is true of the wings or blades themselves since the forward portion of each of the rotor wings will function as an air stabilizer and lift surface while control will be given by the lift control or tab which trails.

The tabs 102 on the spars 100 are used to control the ship. For example, the tab on the rear spar may be used as a rudder. The tabs on the two side spars may be directed either forward or backward, depending upon which way the ship is to fly. For example, if the two side tabs are directed rearwardly, the down slipstream of air from the rotor will strike them deflecting the slipstream rearwardly, sending the craft forward. But if the tabs are directed forwardly, the down slipstream will strike them, moving the ship rearwardly. The tab on the forward spar may be set to counterbalance any unequal weight distribution in the air frame, such as passengers, baggage, etc., and may also be used to counteract torque. In the event that an engine is used which creates torque, I may use the separate outer small tabs, such as at 106 in FIGURE 9, which may be set as a group, independently of the main tabs 108, to counteract torque, with the forward tab being used for trim.

Additionally, the craft will not have a maximum speed at which it can be flown as dictated by the stall problem incident to the retreating blade on a helicopter where stalling starts at the blade tip and gradually spreads inboard. In contrast, my unit, at least in theory, can attain any speed in any direction, the point being that the craft does not have an effective retiring blade with respect to the direction of flight of the aircraft because of the ducted rotor principle used here. Thus, I gain a high degree of stability and equilibrium. Further, the blades are fully ducted which prevents the blades from running into an airstream perpendicular to the plane of blade rotation. Thus, stalling on the retiring wing is not possible.

The arrangement is such that the rotor will create a down slipstream of air over the cabin through the duct. The teardrop shape of the cabin or fuselage itself, small end up, is consistent with the slipstream down of the air and is an extension of the venturi effect of the duct, thereby contributing to the lift characteristics of the craft itself. This is particularly true where the air flows off of the large lower sides of the fuselage, having the sides and thereby creating turbulence on the flat bottom, producing a positive pressure and an uplift effect on the flat lower surface 67.

In landing, the flat bottom of the fuselage or cabin acts as a flat entry surface breaking down the speed of descent. A cushion of air builds up under the flat surface. As the craft descends, air will spill over the edge of the fuselage, pass upward over the sides of the cabin, thereby again creating turbulence and lift due to the air foil shape of the upper cabin. As the air passes up through the duct, during descent, it acts on the wide rotary wing design of the rotor, thereby creating good autogyro descent. Further, the air passing up on the outside of the duct will enter the large cup shaped overhang or gutter which provides a large area air brake. The duct will be the last portion of the craft to descend when the aircraft is in landing position and thereby prevents roll, pitch or yaw. Therefore, the cup shaped overhang functions as a stabilizer as well as a landing flap or brake. It will also be noted in the schematic of FIGURE 8 that the air passing up on both sides of the duct will be separated by the overhang and the two airstreams will not reunite for a certain distance above the annular surface 110 on top of the duct, depending upon the width of the overhang. This also will create turbulence in the area directly above the overhang and a low pressure area thereby developing good lift characteristics when landing and descending. When the aircraft is rising, the top of the overhang will present little, if any, resistance to ascension since it is a convex surface. When the aircraft is in forward flight, the cup-shaped ring at the upper and outer edge of the duct will provide some lift similar to the cord and camber of a wing section.

Further, the fuselage itself is constructed so that excellent visibility is acquired and at the same time is balanced in relation to the entire aircraft. The unit can be made of any suitable material, and where I have indicated fiberglass, steel tubes and the like, it should be understood that other suitable materials may be employed.

The landing gear has the advantage that the two forward wheels do not block visibility and the rear wheel is not in the way of either alighting or departing passengers. Further, the engine compartment is above the occupants of the cabin but at the same time it is suspended below the rotor structure so that maximum stability is acquired. There is no tail section extending behind the pilot nor is there an engine in front of him to block his view. There is no fixed wing to try to look around and in effect the pilot will have 360° of visibility.

The particular construction of the landing gear where the multiple plies of a woven fabric, such as fiberglass, are dipped into a suitable resin, such as an epoxy, and then pulled into the tubing, has particular advantage in that it will provide a spring action but at the same time will give full return.

Another advantage of the present ducted rotor type arrangement is that speed control is not necessary. The rotor can be set at a suitable r.p.m. and left. Thereafter, control is acquired by trimming the trailing tabs or lift controls.

When an aircraft of the present type is moving across the ground, it will tilt slightly, but not much since the center of gravity is well below the rotor. But it will tilt somewhat depending on the amount of forward speed.

While I have not shown the details of the engine which would be positioned in compartment 54, it should be understood that it may be of any suitable conventional type. While I have shown three rotary wings on the spinner, it should be understood that more or less may be used. Further, the drive to the wings may be purely mechanical and has not been shown. Also, the controls to the lift controls or tabs have not been shown and may be of any suitable type. While I have shown the wings as rotating counterclockwise, it should be understood that they may rotate the other way.

While I have shown and described the preferred form and several variations of my invention, it should be understood that suitable additional modifications, changes, substitutions, alterations and variations may be made. It should, therefore, be understood that I wish the invention unrestricted, except as by the spirit as expressed herein.

I claim:

1. In an aircraft of the vertical take-off and landing type, a landing gear including a plurality of outwardly extending wheel units, each being connected to the cabin of the aircraft by a flexible strut each strut including a flexible tube with a plurality of longitudinally disposed fabric strips therein tightly compressed as a unit within the tube, and impregnated with a resin composition.

2. The structure of claim 1 further characterized in that the resin composition is an epoxy resin.

3. The structure of claim 1 further characterized in that the fabric strips are made of woven fiberglass.

4. The structure of claim 1 further characterized in that the fabric strips are first longitudinally bunched, soaked in the resin composition, and then pulled into the flexible tube.

5. In an aircraft, an air frame suspended from and rigidly connected to a rotor unit, the rotor unit including a circular duct surrounding a rotatably mounted power driven rotor having a plurality of radially disposed blades joined rigidly to a central hub, at least most of the blades having an adjustable lift control on the trailing portion thereof.

6. The structure of claim 5 further characterized in that each of the blades is an air foil in cross section.

7. The structure of claim 5 further characterized in that the air frame is rigidly connected to the circular duct by a plurality of generally radially extending struts, at least some of the struts having a rigid upper portion and an adjustably mounted control surface on the lower portion thereof.

8. The structure of claim 5 further characterized in that the blades are in the form of a rotary wing with a cord and camber of high lift in cross section.

9. The structure of claim 8 in which the rotatable wings are set at an angle of attack of a few degrees.

10. An air frame for use in a vertical take off and landing aircraft, the air frame being generally teardrop shaped, large end down, including a plurality of outwardly disposed longerons coming together at top and bottom connected to top and bottom rings at each end thereof, the bottom ring being somewhat larger than the top ring, at least two intermediate rings extending around and connected to the longerons, the upper intermediate ring defining an engine space above it and a cabin space therebelow, the lower intermediate ring being substantially larger in diameter than the top and bottom rings, and a plurality of windows disposed about the air frame between the upper and lower intermediate rings and adjacent longerons, and two relatively closely spaced longerons generally in the front of the fuselage providing a passageway for controls between the cabin space and the engine space.

11. The structure of claim 10 further characterized by and including a tricycle landing gear including wheels on the outer end of outwardly extending flexible struts, spaced approximately 120° apart, one such wheel extending rearwardly and the two others forwardly and on each side of the paired longerons, the two forward wheels being fixed while the rear wheel is a caster.

References Cited by the Examiner

UNITED STATES PATENTS

| | | | |
|---|---|---|---|
| 2,466,821 | 4/1949 | Owen | 244—17.17 |
| 2,994,384 | 8/1961 | Stevens | 244—17.19 |
| 3,018,984 | 1/1962 | Le Beau Rust | 244—17.19 |
| 3,106,370 | 10/1963 | Sudrow | 244—17.19 |
| 3,193,221 | 7/1965 | Victorian et al. | 244—17.17 |

FOREIGN PATENTS 699,228  10/1940  Germany.

MILTON BUCHLER, *Primary Examiner.*

FERGUS S. MIDDLETON, *Examiner.*

L. C. HALL, A. E. CORRIGAN, *Assistant Examiners.*